United States Patent [19]

McQueen

[11] Patent Number: 4,815,231
[45] Date of Patent: Mar. 28, 1989

[54] TRAP FOR SMALL CRAWLING PESTS

[76] Inventor: Robert McQueen, 2744 Shipley Ter., SE., Washington, D.C. 20020

[21] Appl. No.: 125,581

[22] Filed: Nov. 25, 1987

Related U.S. Application Data

[63] Continuation-in-part of Ser. No. 789,645, Oct. 27, 1985, Pat. No. 4,709,503.

[51] Int. Cl.⁴ .............................................. A01M 1/14
[52] U.S. Cl. ......................................... 43/114; 43/121
[58] Field of Search ................. 43/114, 116, 121, 117, 43/132.1

[56] References Cited

U.S. PATENT DOCUMENTS

| | | | |
|---|---|---|---|
| 514,388 | 2/1894 | Smith | 43/121 |
| 790,876 | 5/1905 | Andrus | 43/121 |
| 1,208,987 | 12/1916 | Lacht | 43/121 |
| 3,023,539 | 3/1962 | Emerson | 43/114 |
| 3,913,259 | 10/1975 | Nishimura | 43/114 |
| 4,161,079 | 7/1979 | Hill | 43/114 |
| 4,208,828 | 6/1980 | Hall | 43/114 |
| 4,349,981 | 9/1982 | Sherman | 43/114 |
| 4,709,503 | 12/1987 | McQueen | 43/114 |

FOREIGN PATENT DOCUMENTS 37987 10/1923 Norway ................................ 43/114

OTHER PUBLICATIONS

Michigan Entomological Society Newsletter, vol. 29, No. 1, Mar. 12, 1984.

*Primary Examiner*—Kurt Rowan
*Attorney, Agent, or Firm*—Banner, Birch, McKie & Beckett

[57] ABSTRACT

A trap for small crawling pests, such as mice, including an enclosed crush-resistant housing structure having first and second opposed mouse entry openings. A removable lower tray is removably positionable in the housing structure on the floor thereof. The lower tray has a pair of separated longitudinal glue strips thereon adapted to catch two mice who have crawled into the housing structure through the first entry opening. A shelf is fixed in the housing structure intermediate the floor and ceiling thereof. An upper glue tray similarly adapted to catch two mice thereon is removably positionable on the shelf. A ramp in the housing structure provides a path for mice entering through the second entry opening to the upper glue tray.

29 Claims, 4 Drawing Sheets

TRAP FOR SMALL CRAWLING PESTS

This is a continuation-in-part of copending application Ser. No. 789,645, filed Oct. 27, 1985, which issued Dec. 1, 1987 as U.S. Pat. No. 4,709,503, whose entire contents are hereby incorporated by reference.

BACKGROUND OF THE INVENTION

The present invention relates to devices for trapping and killing crawling pests, such as insects, mice and the like. It more particularly relates to baited glue traps for trapping and controlling populations of cockroaches and waterbugs. It also pertains to glue traps for trapping mice, and other small crawling undesirable animals.

Numerous devices for trapping crawling insects are know, and an example of one is the "Mr. Sticky" distributed by Mitsuboshi Boeki, Inc. The "Mr. Sticky" is used primarily to indicate where infestation exists and the direction from which the crawling insects are coming and to thereby target the areas of infestation for clean-out. It essentially is a foldable, open-ended cardboard tent having a baited sticky floor. When the insects (adults, nymphs and eggs) and their body parts become stuck to the floor a rather unsightly mess which can easily be seen through either end of the tented trap is presented. The entire trap must be disposed of when the floor becomes crowded with pests.

Another example of a crawling insect trap is the "Roach Motel" distributed by Boyle-Midway, Inc., of New York, N.Y. It similarly comprises a fold-up cardboard box having both of its ends open and baited sticky surface(s) in the interior thereof. Again, the unsightly insect mess stuck to the surfaces can be easily seen through both ends. Also, the structure is very flimsy and cannot withstand any weight on it. Further, when the baited sticky surface is full of insects the entire structure must be disposed of.

A further example of a trap is the "Stick-A-Roach" manufactured by J. T. Eaton Company, Inc. It comprises simply a tray having a prebaited formula and a glue surface for catching the insects. Since the entire glue surface is exposed, the captured insect mess thereon is visible. The surface is also exposed so that birds, small pets, or other non-target animals can accidently become stuck to the glue and be injured or killed. Similarly, when the trap is filled with insects the entire trap is to be discarded as in a waste container.

An example of a glue type of mouse trap is the "Mouse-In" distributed for example by Brody Enterprises of Fairlawn, N.J. 07410. It simply comprises a flimsy cardboard pop-up ninety degree triangular trap which is open at both ends. When a mouse gets stuck to the glue surface therein the entire trap is disposed of.

SUMMARY OF OBJECTS OF THE INVENTION

Therefore, according to one embodiment of this invention a crawling insect trap including a housing and one or more shelves positionable in the housing is provided. The housing is formed from a top, a bottom, a pair of opposite side walls, and an end wall. The side walls and the end wall are each connected to the top and the bottom. The housing is made from a hard material such as a hard plastic so as to define a generally rigid structure. One or more shelves are positioned in the housing in pairs of oppositely disposed U-shaped channels secured to the side walls. Baited sticky surfaces are provided on both sides of each of the shelves. Each of the outer surfaces of the housing has a plurality of elliptical openings passing therethrough. Thus when insects attracted to the dark baited interior of the housing crawl through the holes they will become stuck to the sticky surfaces. When the surfaces become covered with the insects, the shelves can be removed and new shelves inserted therein. It is thus not necessary to replace the entire trap when the surfaces become covered with insects. The end of the housing opposite to the end wall has a cover which is movable between an "open" position in which the interior of the housing is exposed and through which the shelves can pass and a "snap-closed" position. When in its "closed" position the housing with the exception of the small elliptical holes is closed, and, thus, the interior of the housing including the baited sticky surface with the insects stuck thereto is not generally visible. Further, a sticker is provided on the bottom surface so that the entire housing can be secured to any surface including vertical and downwardly-facing horizontal surfaces.

According to a second embodiment of this invention, an improved trap for catching small crawling pests, such as mice, is provided. The trap includes a crush-resistant housing structure having small mouse entry openings at opposite first and second ends thereof. The first entry opening opens to the floor of the housing structure on which a lower tray having a sticky mouse catching material on its upper surface is positionable. A support means in the housing structure supports an upper tray spaced above the lower tray. Mice who crawl in the second entry opening crawl up a gently-sloping housing ramp to the upper tray where they become stuck to the upper sticky surface of the tray. The housing structure is sized and adapted to simultaneously trap and hold therein four mice including their tails—two mice on the upper tray and two on the lower tray. The first housing end can then be opened, both trays with their catches thereon removed, fresh trays inserted and the first end snapped closed. A few small openings in the sides of the housing structure allow the user to see whether any mice are trapped on either tray therein. Since the side and end openings are small and the housing structure otherwise enclosed, the sticky tray material is exposed to minimal dust and dirt and therefore will remain effective longer than many prior art glue traps.

Thus, it is a principal object of the present invention to provide an improved crawling pest trap.

Another object of the present invention is to provide an improved crawling pest trap which is safe around food, children and pets.

A further object is to provide a small crawling pest trap which is durable, crush and collapse resistant, and inexpensive to manufacture.

A still further object is to provide an improved trap adapted to trap and contain therein a plurality of mice, hidden out of sight.

Another object is to provide an improved glue trap for mice whose glued surfaces are longer lasting.

A further object is to provide an improved glue trap for mice which does not need baits or poisons to attract the mice.

A still further object is to provide an improved pest trap design which fits unobtrusively in a commercial or residential structure.

Another object is to provide a crawling insect trap which is compact and easily positioned unnoticed in structures better blending in with the environment.

A further object is to provide a novel crawling insect trap which is inexpensive and easily fits on any surface of any orientation.

A still further object is to provide a novel insect trap which hides the unattractive mess of insect pests, adults, nymphs and their eggs stuck to the glue surfaces therein.

Another object is to provide a novel crawling insect trap which can be easily set in narrow enclosed spaces.

A further object is to provide a novel insect trap which better attracts crawling insect pests including cockroaches, waterbugs, crickets, palmetto bugs and other annoying crawling insects.

A still further object is to provide an improved crawling insect trap design which is less likely to capture birds, small pets and other non-target animals.

Another object is to provide an improved insect trap which is safe to use in hospitals, restaurants, day care centers and other places where poisons are banned.

A further object of the present invention is to provide a novel crawling insect trap which is designed for long term crawling insect control and reduction of insect population.

A still further object of the present invention is to provide an improved crawling insect trap which is able to withstand small weights thereon and is thereby less likely to be crushed.

Other objects and advantages of the present invention will become apparent to those persons having ordinary skill in the art to which the present invention pertains from the foregoing description taken in conjunction with the accompanying drawings.

DETAILED DESCRIPTION OF THE PREFERRED EMBODIMENTS

Figure 1:
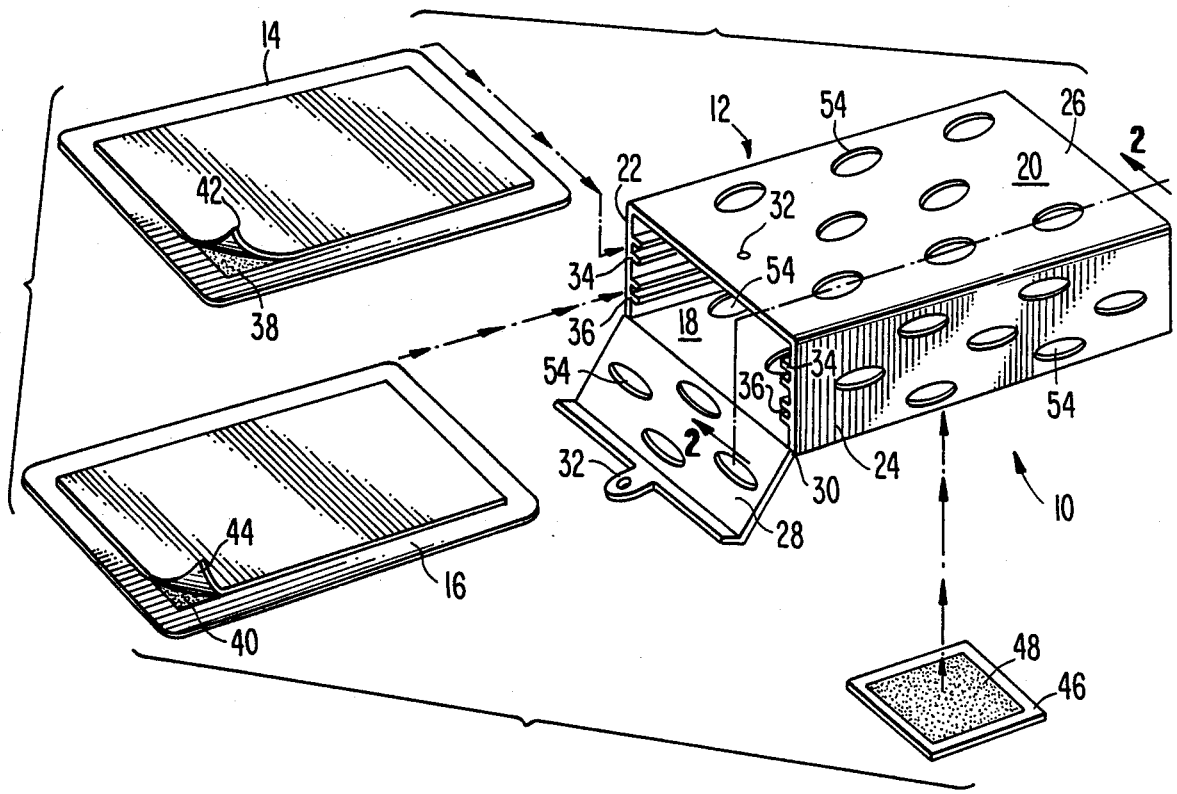
FIG. 1 is a perspective view of a crawling insect trap of the present invention illustrating parts thereof in exploded relation.
Figure 2:
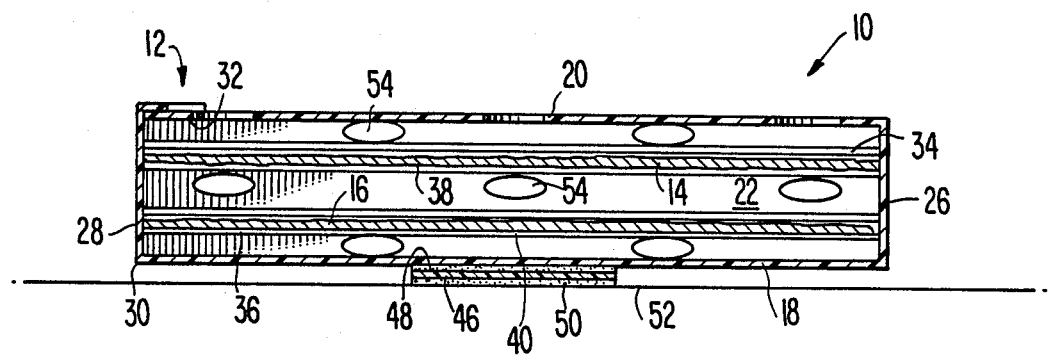
FIG. 2 is a cross-sectional view taken along line 2—2 of FIG. 1.

A first embodiment of a trap of the present invention, which is particularly designed for trapping crawling insects, is illustrated in FIGS. 1 and 2 generally at 10. The trap 10 is seen to basically comprise a housing shown generally at 12 and removable panels or shelves 14 and 16 positionable within the housing 12.

Housing 12 has a box-like configuration, and comprises a bottom 18, a top 20, a pair of opposite side walls 22, 24 interconnecting the top and bottom, an end wall 26 interconnecting the top and bottom and fixed thereto, and an opposite end wall or cover 28. The exterior surfaces of the housing 12 can be of any suitable color or wood-type grain to match the surrounding structures and environment and to make the trap 10 less visible and obtrusive. As shown, the opposite end cover 28 is hinged at its lower edge 30 to the bottom 18 so that it can be moved from an open position as shown in FIG. 1 exposing the interior of the housing 12 for removal and replacement of the shelves 14, 16, and a closed position, as shown in FIG. 2, for securing the shelves 14, 16 in housing 12 and also for hiding the interior of the housing and the shelves from the exterior. The end cover 28 is secured in its closed position by a snap 32 or any other suitable securing means.

The shelves 14, 16 are removable from the housing 12 for replacement thereof. Two pairs of oppositely positioned and aligned U-shaped channels 34, 36 are secured to the opposite side walls 22, 24 and the shelves are then slid into position in the space defined by U-shaped channels 34, 36. Although two shelves are illustrated in the drawings, it is also within the scope of the present invention to provide only one centrally located shelf, or to provide three or more spaced shelves. Each of the shelves has sticky glue surfaces on both of its sides 38, 40 so that insects can be trapped on either or both sides. For ease of handling each of the glue sides has a removable or peelable glue cover 42, 44 which protects the sticky material and is removed immediately prior to inserting the shelves 14, 16 into the housing 12. It is also within the scope of the present invention to bait the sticky surface, and a suitable known bait contains powered chrysalis (84.5%), sodium enzoate (0.5%) and precipitated calcium carbonate (15.0%). The bait is either placed in the center of the sticky surface or scattered on the surface after removing the peel off paper or glue cover.

A glued sticker 46 having glue on both sides 48, 50 thereof is attached to the bottom 18 of the housing 12. After the glue cover has been removed from the bottom of the sticker 46, the housing 12 can be secured to surfaces in any orientation, such as shown by surface 52 in FIG. 2. It is especially useful for securing the housing to out-of-the-way vertical surfaces or the lower surface of a horizontal members, such as in or under cupboards. The U-shaped channels 34, 36 hold the shelves 14, 16 in place in the housing 12 when the housing is in an upside down or non-horizontal orientation. The trap 10 thus has the flexibility of being placed in many hard-to-reach areas and also in locations which are not readily visible. In contrast, most prior art traps do not have this feature and must rest on horizontal surfaces such as on floors or on shelves. Thus, the present trap can be easily fitted for example on walls, underneath tables, behind bookcases, and inside closets, cabinets, medicine cabinets, chests and dresser drawers.

Each of the surfaces of the housing, namely the top 20, the bottom 18, the sidewalls 22, 24 the end wall 26 and the end cover 28, is provided with a plurality of elliptical holes 54 through which the insects can crawl to get to the dark interior of the housing and also to the baited material therein. As can be appreciated, the holes, while large enough (1/6 to ⅛ inch in diameter) to provide easy access from all directions for insects to the interior of the housing and its baited glue surfaces, are not so large as to effectively expose the interior of the housing and the shelf surfaces. Also the housing, since it is totally enclosed, provides an enclosed, darker, more inviting and insect-beckoning trap than many prior traps.

The components of the housing 12 are constructed from durable materials, such as hard plastics, to define a structure which can support small weights up to generally twenty pounds. It thus is not as likely to be crushed as are the prior flimsy cardboard structures. Although illustrated as a box configuration having preferred dimensions of four inches by two inches by one inch, any suitable configuration such as a semicylinder can be used.

Thus, the present trap 10 is very simple to use. The desired location is selected, the peel-off paper of the glue sticker 46 is removed and the glue sticker adhered to the bottom 18 of the housing. The peel-off panel of the opposite side of th glue sticker is removed and the housing 12 is adhered to the desired surface 52. The shelves 14, 16 can be placed in the housing 12 either before the housing is secured in the desired location or after. To secure shelves 14, 16 in the housing, it is a simple matter of removing the peel-off glue covers from both sides of all the shelves and inserting the shelves through the open end of the housing into position therein. Then housing end cover 28 is closed by snapping snap 32, and an effective semipermanent structure for capturing annoying crawling insects is thereby defined. When shelves 14, 16 become filled with insects it is a simple process of unsnapping snap 32 of end cover 28, removing shelves 14, 16 and inserting new shelves into the housing. It is expected that the shelves will only cost pennies and it is not necessary to replace the entire housing each time the baited glued surfaces become filled with insects. The trap 10 thereby provides a very inexpensive, easy to use and safe means for trapping and disposing of crawling insects.

Figure 3:
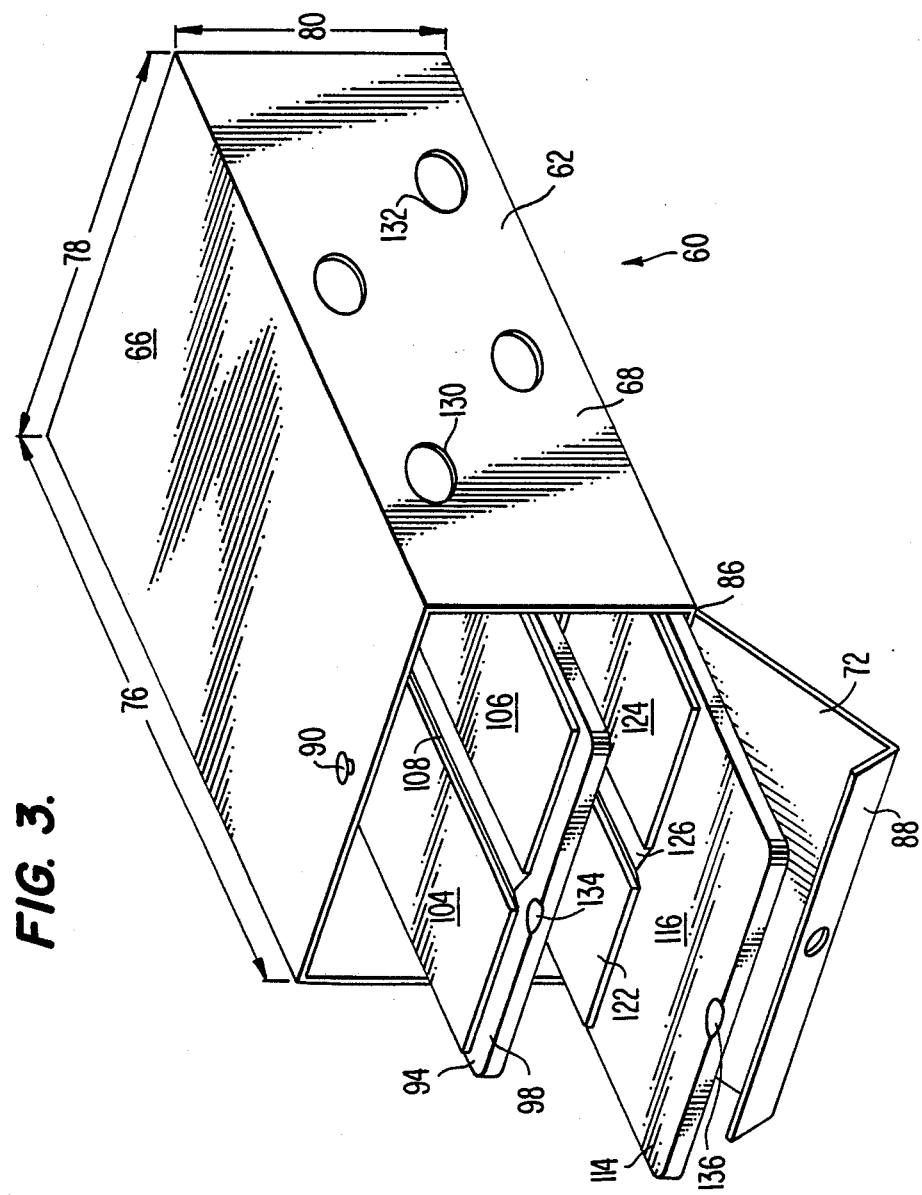
FIG. 3 is a perspective view of a second trap of the present invention specially adapted for capturing mice and shown with the front end thereof open so that the glue trays thereof can be inserted or removed.

A second trap embodiment of the present invention is illustrated generally at 60 in FIGS. 3-7. Trap 60, as will become more apparent from the discussion to follow, is particularly adapted for trapping mice. Trap 60 includes a box-shaped housing structure shown generally at 62 which includes a floor 64, a roof or ceiling 66, a pair of opposite spaced side walls 68, 70, a first end 72 and an opposite second end 74. Referring to FIG. 3, the housing structure 62 preferably has a length 76 of six inches, a width 78 of four inches, and a height 80 of three and a half inches.

Figure 4:
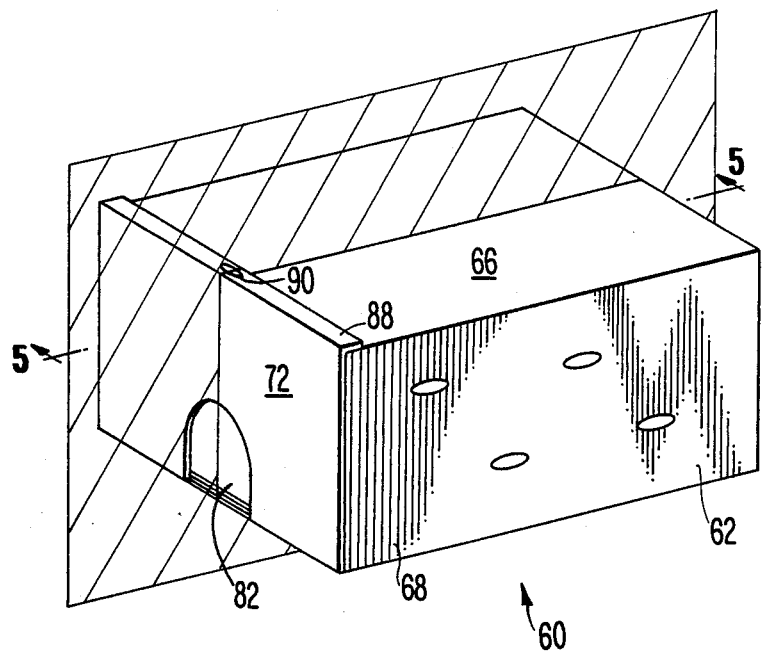
FIG. 4 is a perspective view of the trap of FIG. 4 with the front end thereof shown in a closed position.

The first and second ends 72, 74 have first and second entry openings 82, 84, respectively, generally at the middle of their lower edges, each opening is one and a quarter inch semi-circular, or alternatively a one inch round opening. The first end 72 is hinged along its lower edge 86 so that it can be moved to an "open" position as best shown in FIG. 3. A lip 88 is formed along the top edge of the first end 72 which folds on top of the roof 66 when the first end 72 is moved to its "closed" position, as shown in FIGS. 4 and 5, and the snap 90 snapped to hold the first end 72 in the "closed" position.

Figure 5:
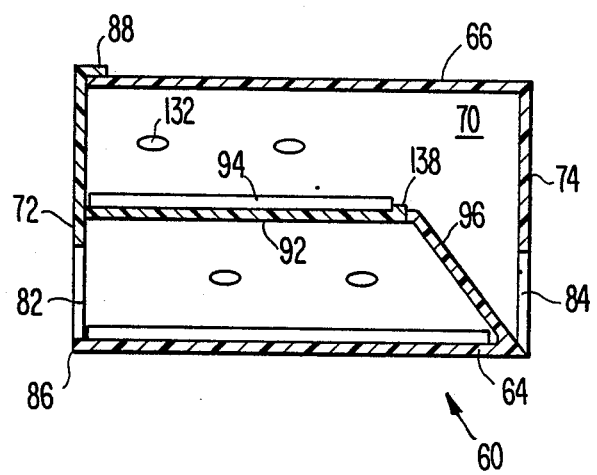
FIG. 5 is a cross-sectional view of the trap of FIG. 3 taken along line 5—5 of FIG. 4.

A horizontal shelf 92, as depicted in FIG. 5, is fixed in the housing structure 62 spaced between the ceiling 66 and the floor 64, and an upper tray 94 is removably positionable to rest on the shelf 92. A ramp 96 extends from the second end 74 up to the shelf 92 so that mice crawling in through the second entry opening 84 will crawl up the ramp 96 and onto the upper tray 94.

Figure 6:
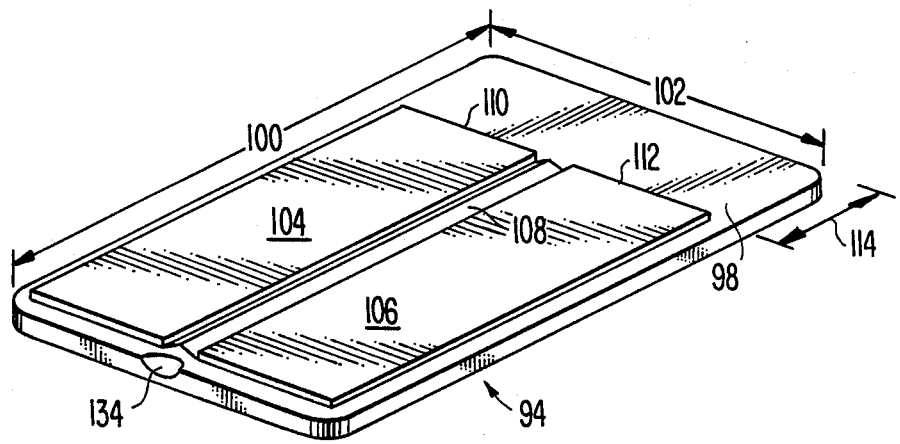
FIG. 6 is a perspective view of the upper tray of the trap of FIG. 3 shown in isolation.

The upper tray 94, as shown in FIG. 6, comprises a thin rectangular panel 98 having a preferred length 100 of four and three-eights inches, and a width 102 of three and four-fifths inches. Two longitudinal one quarter inch thick glue strips 104, 106 are formed on the upper surface of the panel 98 and are divided by an elongated raised member 108. As can be seen, the rear edges 110, 112 of the glue strips 104, 106 are spaced a distance 114 of one inch from the rear edge of the panel 98.

Figure 7:
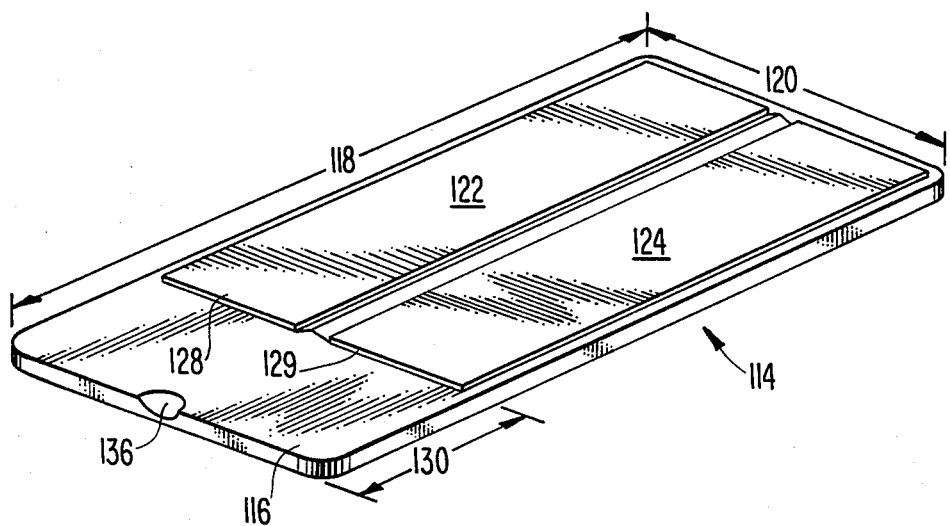
FIG. 7 is a perspective view of the lower tray of the trap of FIG. 3 shown in isolation.

A lower tray 114 is removably positionable in the housing structure 62 on the floor 64. The lower tray 114, as shown in FIG. 7, similarly comprises a thin rectangular panel 116 having a preferred length 118 of five and seven-eights inches, and a width 120 of three and four-fifths inches. It also has a pair of longitudinal glue strips 122, 124, each one-fourth inch thick formed on top of the panel 116, and an elongated raised member 126 separates the glue strips 122, 124. The forward edges 128, 129 of the glue strips 122, 124 are spaced a distance 130 of two and a half inches from the forward edge of the panel 116 thereby providing a space which allows the mice to get generally all of the way onto the lower tray 114, and thus into the housing structure 62, before getting stuck to the glue strips 122, 124.

A plurality of small generally elliptical or circular openings or peep holes 132, each of about one-fourth inch diameter, in the side walls 68, 70 allow the interior of the housing structure 62 to be seen, but only upon a close careful inspection thereof, to determine whether one or more mice are caught on the upper or lower trays 94, 114. If one or more mice have been caught, the snap 90 can be unsnapped, the first end 72 opened and the upper tray 94 and/or lower tray 114 removed by grasping finger indents 134, 136 in the upper and lower panels 98, 116, respectively, and lifting and sliding them out. New trays can then be slid into place in the housing structure 62. A bumper 138 at the rear end of the shelf 92, as best shown in FIG. 5, prevents the upper tray 94 from being slid rearwardly too far and over the ramp 96. With the new trays in place the first end 72 is closed and the snap 90 snapped.

The housing structure 62 is formed of a durable material, such as a hard plastic, so as to be able to support about twenty pounds thereon and thereby be collapse and crush resistant. Since only a few small openings (entry openings 82, 84 and peep holes 132) are formed in the housing structure 62 the surfaces of the glue strips during usage are exposed to only minimal dust and other foreign objects and thus will have long effective lives. The trap 60 is large enough and is configured to effectively trap and simultaneously hold four mice therein, including their tails, and thus because the openings therein are so small the trapped mice cannot generally be seen except by a very close deliberate inspection. As can be appreciated, the trap 60 forms a semi-permanent structure and is constructed and designed to blend in with its surroundings. Since no baits or poisons are used, the trap 60 thereby defines a mouse trap which is generally safe to even small children and household pets.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:
1. A trap for small crawling pests, such as mice and the like, comprising:
    a housing structure including at least one wall, a floor, a first end and a second end, a lower tray positionable in said housing structure at a lower tray location therein, said first end defining a first end opening therethrough providing access for a small crawling pest from the exterior of said housing structure to said lower tray when positioned at said lower tray location, said lower tray having an upper surface and a sticky crawling pest catching material on said upper surface, said second end defining a second end opening therethrough providing access for a small crawling pest from the exterior of said housing structure to the interior thereof, an upper tray positionable in said housing structure at an upper tray location therein spaced a distance generally above said lower tray location such that a small crawling pest can crawl through said first end opening into said housing structure and generally between said upper and lower trays positioned respectively at said upper and lower tray locations, said upper tray having an upper surface and a sticky crawling pest catching material on said upper surface, and a ramp access means disposed in said housing structure for providing crawling access for a small crawling pest, who has passed into said housing structure through said second end opening, up to said upper tray when said upper tray is positioned at said upper tray location and to said sticky crawling pest catching material on said upper surface of said upper tray.

2. The trap of claim 1 including,
said housing structure including a floor.

3. The trap of claim 2 including,
said lower tray location being on said floor.

4. The trap of claim 2 including,
said at least one wall including first and second walls attached to said floor.

5. The trap of claim 4 including,
said housing structure including a ceiling spaced above said upper tray location such that a crawling pest passing through said second end opening can crawl between said ceiling and said upper tray.

6. The trap of claim 5 including,
said first and second walls being spaced from one another and attached at their upper edges to said ceiling, and said first and second ends being disposed opposite to each other and both being attached to said first and second walls and to said ceiling.

7. The trap of claim 1 including,
a positioning means in said housing structure for positioning said upper tray at said upper tray location.

8. The trap of claim 7 including,
said positioning means including an upper tray support shelf connected to said wall and disposed generally at said upper tray location.

9. The trap of claim 8 including,
said ramp access means including an inclined ramp positioned in said housing structure and extending generally from said second end opening upwards to said upper tray support shelf.

10. The trap of claim 9 including,
at least one upwardly-extending stop member at the edge of said upper tray support shelf generally adjacent to said inclined ramp adapted to prevent said upper tray from sliding on said upper tray support shelf further towards said second end.

11. The trap of claim 7 including,
said wall including first and second spaced walls, and
said positioning means including opposed first and second support brackets at said first and second walls, respectively.

12. The trap of claim 1 including,
said upper tray when positioned at said upper tray location having its end closest to said second end being spaced therefrom so that a crawling pest who has crawled in through said second end opening can crawl between said closest end and said second end to said upper surface of said upper tray.

13. The trap of claim 1 including,
said wall defining a first wall opening providing visualization therethrough to determine from the exterior of said housing structure whether a crawling pest is on one of said upper and lower trays in said housing structure.

14. The trap of claim 13 including,
said wall defining a second wall opening therethrough providing visualization therethrough to determine whether a crawling pest is on the other of said upper and lower trays in said housing structure.

15. The trap of claim 13 including,
said first wall opening being sized so that the crawling pest who has crawled in through either said first or second end openings cannot pass out therethrough.

16. The trap of claim 1 including,
at least one said upper and lower trays being removable from said housing structure as to dispose of a crawling pest thereon.

17. The trap of claim 16 including,
said first end being movable between an open position allowing removal of said at least one said upper and lower trays from said housing structure and a closed position for containing crawling pests in said housing structure.

18. The trap of claim 17 including,
said first end having a first edge portion and a second edge portion,
said first end being hingedly connected at said first edge portion to said housing structure, and
a releasable securing means for releasably securing said second edge portion to said housing structure.

19. The trap of claim 18 including,
said releasable securing means comprising a snap connector.

20. The trap of claim 18 including,
said releasable securing means comprising a button connector.

21. The trap of claim 18 including,
said first end including a primary first end portion through which said first end opening passes, and a secondary lip portion connected to in an angled relation to said primary first end portion and defining said second edge portion,
said housing structure including a roof member, and
said releasable securing means securing said secondary lip portion directly to said roof member.

22. The trap of claim 1 including,
said upper and lower trays being removable from said housing structure as to dispose of crawling pests thereon, and said first end being movable between an open position allowing removal of said upper and lower trays from said housing structure and a closed position for containing crawling pests in said housing structure.

23. The trap of claim 1 including, said housing structure including a floor member having a lower surface, and a securing means for securing said floor member lower surface to an external surface so as to thereby secure said housing structure to the external surface.

24. The trap of claim 1 including, said housing structure being constructed so as to be crush and collapse resistant.

25. The trap of claim 24 including, said housing structure being adapted to support twenty pounds thereon.

26. The trap of claim 24 including, said housing structure being constructed of hard plastic.

27. The trap of claim 1 including, said first end opening being sized and configured to allow a slightly larger than average size mouse to pass therethrough, said housing structure being sized and configured to contain therein the entire said mouse who has passed in through said first end opening, including the entire tail thereof, on said lower tray, said second end opening being sized and configured to allow said mouse to pass therethrough, and said housing structure being sized and configured to contain therein the entire said mouse who has passed in through said second end opening, including the entire tail thereof, on said upper tray.

28. The trap of claim 1 including, said second end having a second end lower edge, and said second opening generally engaging said second end lower edge.

29. The trap of claim 1 including, said sticky crawling pest catching material of said lower tray comprising a first longitudinal strip and a second longitudinal strip parallel to and spaced from said first longitudinal strip, said first and second longitudinal strips having their edges closest to said first end being spaced generally at least one inch from the end of said lower tray closest to said first end, and said lower tray including a raised dividing member extending longitudinally between said first and second longitudinal strips.

* * * * *